United States Patent [19]
Zillig et al.

[11] Patent Number: 5,909,901
[45] Date of Patent: Jun. 8, 1999

[54] DISCONNECT TOOL FOR A FLUID LINE QUICK-CONNECT ASSEMBLY

[75] Inventors: Steven R. Zillig, Clarence; James E. Caroll, Clarence Center, both of N.Y.

[73] Assignee: Jiffy-Tite Company, Inc., Lancaster, N.Y.

[21] Appl. No.: 09/030,513

[22] Filed: Feb. 22, 1998

[51] Int. Cl.[6] .................................................... F16L 35/00
[52] U.S. Cl. ............................ 285/38; 285/39; 285/308; 285/321; 29/237
[58] Field of Search .................................. 29/237; 285/39, 285/308, 358, 359, 321

[56]     References Cited

U.S. PATENT DOCUMENTS

| | | | |
|---|---|---|---|
| 3,922,011 | 11/1975 | Walters | 285/321 X |
| 4,630,534 | 12/1986 | Hoskins et al. | 285/321 X |
| 4,635,974 | 1/1987 | Moussaian | 285/321 X |
| 4,749,214 | 6/1988 | Hoskins et al. | 285/39 X |
| 5,378,025 | 1/1995 | Szabo | 285/39 |
| 5,455,995 | 10/1995 | Pool | 29/237 |

*Primary Examiner*—Dave W. Arola
*Attorney, Agent, or Firm*—Phillips, Lytle, Hitchcock, Blaine & Huber LLP

[57]     ABSTRACT

The invention is directed to an improved disconnect tool (15). In the preferred embodiment, the disconnect tool is comprised of a first member (16) and a second member (18) connected by a pivot pin (19). The tool includes an engagement means (23) and an expansion means (22) to facilitate the engagement and expansion of a retaining clip so as to permit insertion and removal of a fluid line (39) from a fluid coupling assembly (41). In the preferred embodiment, the expansion means takes the form of a castellated tube portion with a plurality of fingers (20) defining a plurality of grooves (21) therebetween. The fingers are used expand the retaining clip radially and outwardly so as to permit the fluid line to be removed from the fluid coupling assembly. In addition, the present invention is also directed to a method for removing a fluid line from a fluid coupling assembly through the use of a disconnect tool.

12 Claims, 5 Drawing Sheets

DISCONNECT TOOL FOR A FLUID LINE QUICK-CONNECT ASSEMBLY

FIELD OF THE INVENTION

The present invention relates generally to the field of mechanisms for disconnecting fluid lines from fluid coupling assemblies and, more particularly, to an improved device for expanding a retaining clip within a fluid coupling assembly to permit a fluid line to be removed from the fluid coupling assembly.

BACKGROUND ART

A variety of mechanisms have been used in the past to secure fluid lines to fluid coupling assemblies. These mechanisms have been designed to assure that a tight connection exists between the fluid line and the fluid coupling assembly. Examples of such mechanisms are disclosed in U.S. Pat. Nos. 4,902,043, 4,519,449, 4,749,214, 4,538,679 and 4,640,534, the aggregate disclosures of which are incorporated by reference. A number of these devices have also been designed to minimize the time needed to connect fluid lines to fluid coupling assemblies. In particular, U.S. Pat. No. 4,640,534 discloses one such quick-connect assembly. This particular assembly employs a retaining clip which permits easy snap-in connection.

Although these fluid coupling assemblies are useful in providing easy-to-assemble fluid-tight connections, they have the drawback of being difficult to disconnect for repairs or replacement of parts. In the past, manual techniques have been used to disconnect the fluid line from the fluid coupling assembly. For instance, screwdrivers have been used to pry the retaining clip from the clip-receiving groove, thus permitting the fluid line to be removed from the fluid coupling assembly. This has the drawback of being time intensive, and may also plastically deform and damage the retaining clip. Damaged retaining clips may cause problems, such as fluid leakage, vibration interference, metal fatigue and the like.

A second known means of removing the fluid line from the fluid coupling assembly is to physically cut the retaining clip. However, this requires that a new retaining clip be installed each time the fluid line is removed from the fluid coupling assembly. In addition, this method presents safety hazards in that the retaining clip is often manufactured from spring steel and may break away and injure the mechanic removing the fluid line from the fluid coupling assembly. While some disconnect tools are disclosed in the prior art (e.g., U.S. Pat. Nos. 4,055,359, 5,455,995, 4,612,953, and Owatona Tool Company Product No. 7370), none of these are designed to disengage a quick-connection which employs a retaining clip. Hence, it would be useful to provide a disconnect tool which would permit ready expansion of the retaining clip and quick removal of the fluid line from the fluid coupling assembly, with only elastic deformation of the clip.

DISCLOSURE OF THE INVENTION

With parenthetical reference to the corresponding parts, portions or surfaces of the disclosed embodiment, merely for the purposes of illustration and not by way of limitation, the present invention provides an improved disconnect tool (15) for disengaging a fluid line (39) from a fluid coupling assembly (41), the fluid line having a shoulder portion (40) and the assembly having a retaining clip (42) and clip-receiving groove (44), the retaining clip having a plurality of protrusions (48), and the groove having a plurality of slots (49) for receiving the protrusions, such that the protrusions extend through the slots to engage the shoulder portion, and thereby secure the fluid line to the fluid coupling assembly.

The improvement comprises the improved disconnect tool having an engagement means (23) for engaging the fluid line, this engagement means being connected to an expansion means (22) for expanding the retaining clip such that each of the protrusions are disposed outwardly from each of the slots, whereby the fluid line may be removed from the fluid coupling assembly.

The engagement means may also comprise a first member (16) connected to a second member (18) such that the first and second members form a ring-shaped structure having a bore (31) to accommodate the fluid line.

The first and second members may include a cylindrical outer surface (35) which is provided with a knurled texture to facilitate rotation of the disconnect tool. The first and second members may be capable of being locked together with a locking pin (55).

The expansion means may comprise a castellated tube portion (22) having a plurality of fingers (20) and a plurality of grooves (21) therebetween, the fingers and grooves being so configured and arranged as to allow positioning of the fingers to engage the protrusions, whereby the castellated tube portion can be rotated such that the protrusions are displaced radially outwardly by the fingers to allow the fluid line to be selectively disengaged from the coupling assembly.

The disconnect tool may have a handle (50). The engagement means may include a recess (56) which accommodates a square-drive wrench.

The engagement means may comprises a ring-shaped structure having a first side (34) and a second side (58), the expansion means being fixedly connected to the first side and a second expansion means (59) being fixedly connected to the second side. The second expansion means may comprise a different configuration of fingers (60) and grooves (61) than the expansion means. The fingers may be variable in width and depth.

The present invention also discloses a method for disconnecting the fluid line from the fluid coupling assembly, comprising the steps of: providing a disconnect tool having an expansion means, positioning the expansion means to engage the protrusions, rotating the tool with respect to the retaining clip such that the protrusions are displaced radially and outwardly by the expansion means, and removing the fluid line from the coupling assembly.

Accordingly, the general object of the present invention is to provide an improved disconnect tool which permits a fluid line to be readily and easily removed from a fluid coupling assembly.

Another object is to provide an improved method for removing a fluid line from a fluid coupling assembly which utilizes a retaining clip to secure the fluid line to the fluid coupling assembly.

Another object is to provide an improved disconnect tool which permits the fluid line to be removed from the corresponding fluid coupling assembly with controlled elastic expansion of the retaining clip.

Another object is to provide a disconnect tool having a plurality of fingers and plurality of grooves therebetween to permit controlled elastic expansion of a retaining clip having a corresponding number of inwardly-extending protrusions.

Another object is to provide an improved disconnect tool which may be configured and arranged to allow its use with a variety of different fluid coupling assembly geometries.

Another object is to provide an improved disconnect tool which includes a handle which facilitates easy rotation of the disconnect tool.

Another object is to provide an improved disconnect tool which includes a handle which facilitates the use of the disconnect tool when the coupling assembly is difficult to reach by hand or is in a location which has become heated or has sharp protrusions.

Another object is to provide an improved disconnect tool which is configured with a square recess to permit connection with a socket wrench or other similar torque producing tool.

Another object is to provide an improved disconnect tool which is readily modifiable, economical to manufacture, reliable, rugged, and which may be utilized with a variety of fluid coupling designs.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
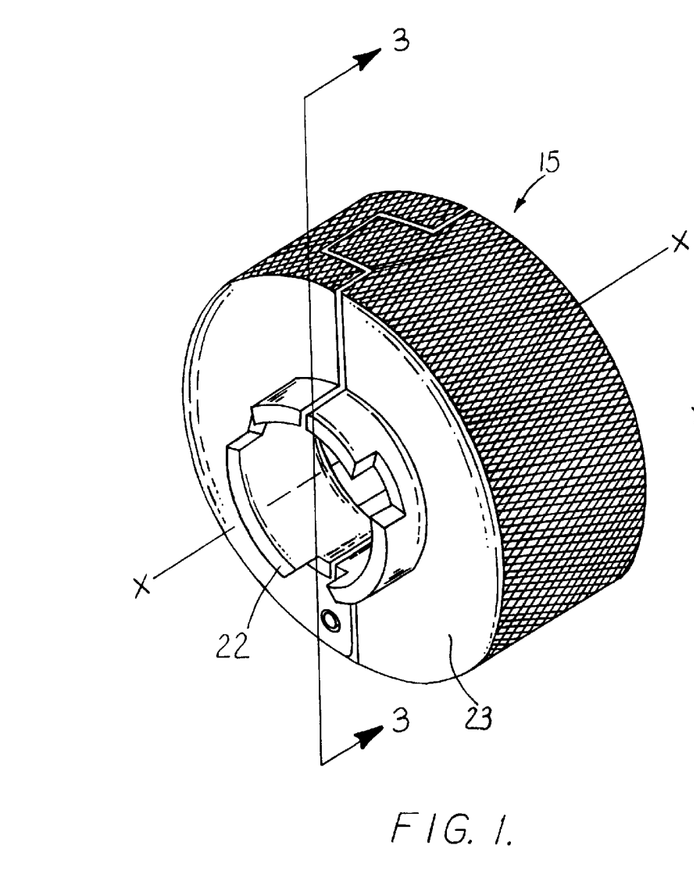
FIG. 1 is a perspective view of the disconnect tool.
Figure 2:
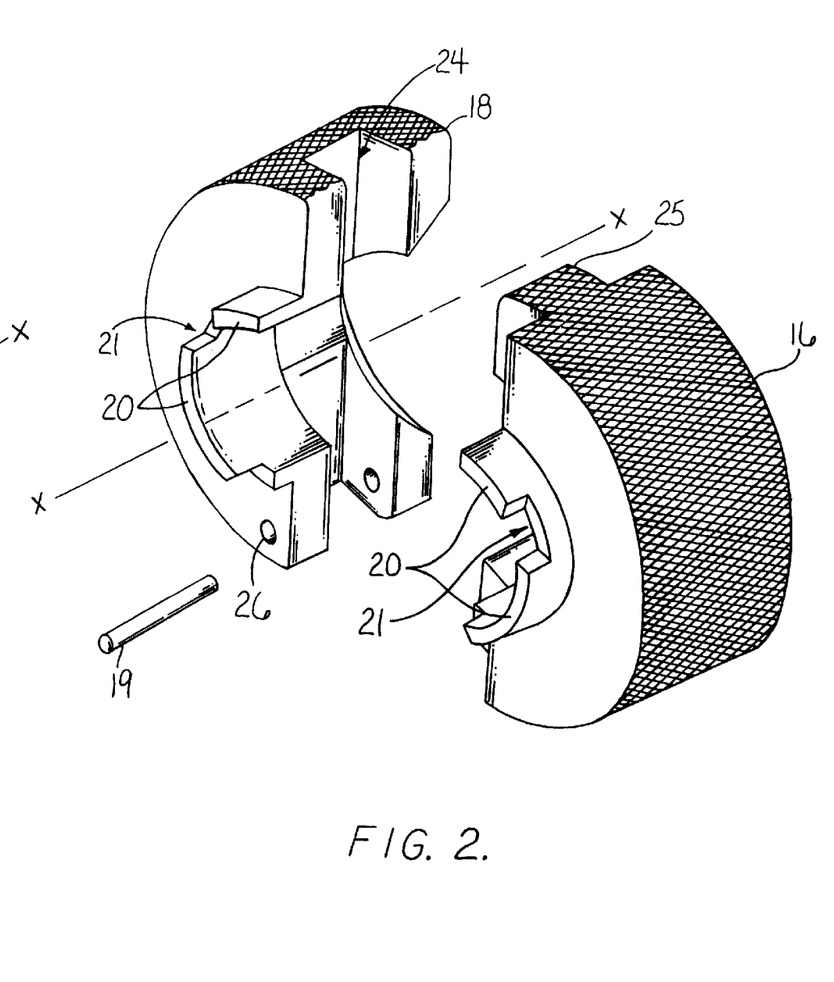
FIG. 2 is an exploded perspective view of the disconnect tool of FIG. 1.

Referring now to the drawings, and, more particularly, to FIGS. 1–2 thereof, this invention provides an improved disconnect tool, of which the presently preferred embodiment is generally indicated at 15. The disconnect tool 15 is shown as broadly including an engagement means 23 and an expansion means 22. Engagement means 23 is comprised of a first member 16 and a second member 18. First and second member 16, 18 appear as semi-circularly-shaped members, when seen in end elevation. First member 16 and second member 18 are formed from a single ring-like shaped element which is subsequently cut generally in half. As best shown in FIG. 2, first member 16 is connected to second member 18 by a pivot pin 19. Pivot pin 19 is arranged to be received in hole 26 in second member 18 and a similar pivot pin hole (not shown) in first member 16. In this manner, first member 16 is allowed to pivot about second member 18 in a clam-shell fashion.

As best shown in FIG. 2, first member 16 is provided with a tongue 25 which protrudes transversely outwardly and is adapted to be received in corresponding slot 24 in second member 18. The geometry of slot 24 is complementary to that of tongue 25. Hence, when first member 16 engages second member 18, the net result is an assembled ring-like structure elongated along axis x—x.

Expansion means 22 includes a castellated tube portion, generally indicated at 22, having a plurality of fingers, severally indicated at 20. Fingers 20 are so configured and arranged so as to generally define a plurality of grooves, severally indicated at 21. Alternating grooves 21 and fingers 20 are each of rectangular shape, as best depicted in FIGS. 1–2. Castellated tube portion 22 is axially and concentrically located with respect to first and second member 16, 18.

The outer surface of first and second members 16, 18 is provided with a knurled texture. This permits disconnect tool 15 to be more securely grasped and facilitates rotational movement of disconnect tool 15 when in use.

Figure 3:
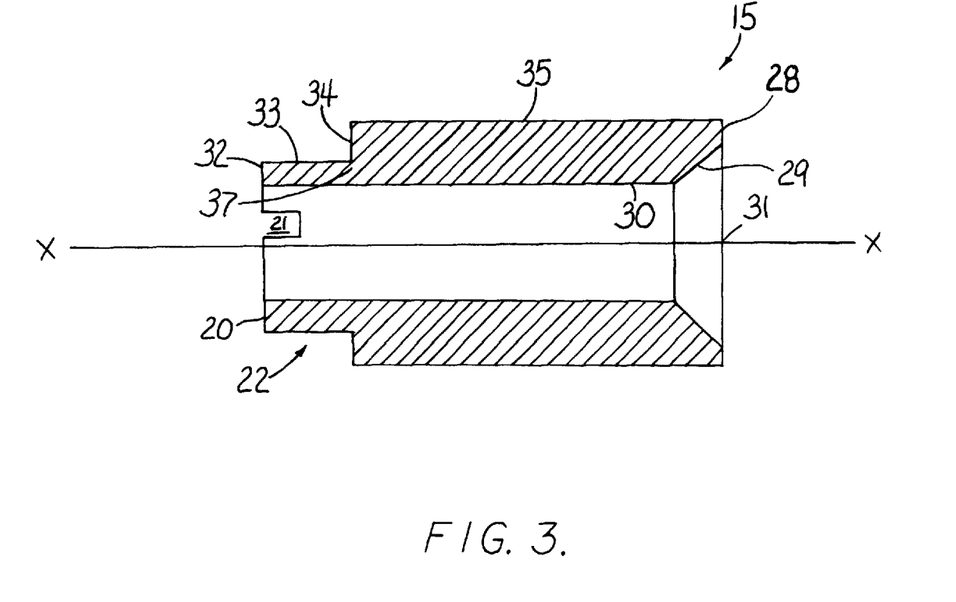
FIG. 3 is a longitudinal vertical sectional view of the disconnect tool shown in FIG. 1, taken generally on line 3—3 of FIG. 1.

First member 16 and second member 18, together, generally define a cylindrical ring-shaped annular structure. Referring now to FIG. 3, this ring-shaped structure is a specially-configured solid member elongated along axis x—x, and is bounded by a rightwardly-facing annular vertical surface 28, a rightwardly and inwardly-facing frusto-conical surface 29, an inwardly-facing horizontal cylindrical surface 30, a leftwardly-facing annular vertical surface 32, an outwardly-facing horizontal cylindrical surface 33, a leftwardly-facing annular vertical surface 34, and an outwardly-facing horizontal cylindrical surface 35, joined at its right marginal end to the outer marginal end of surface 28. Surface 30 generally defines an axial through-bore 31.

Figure 4:
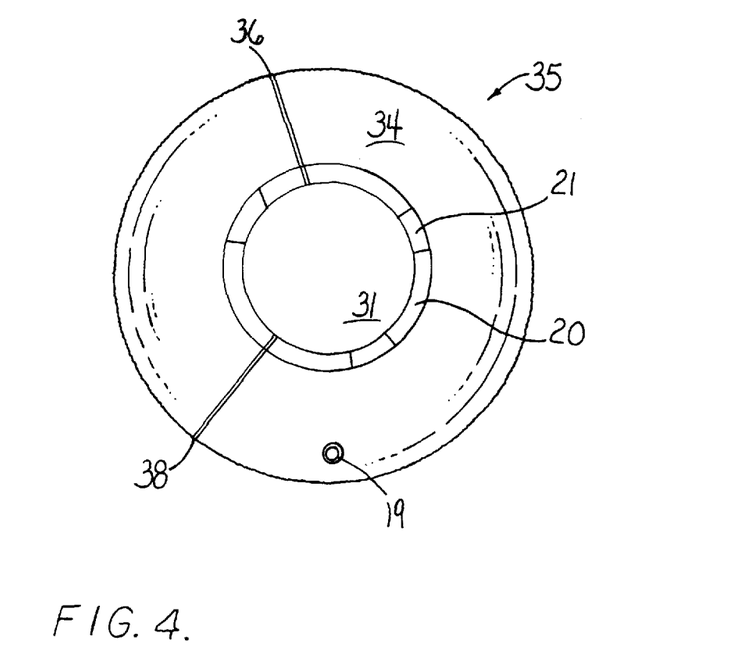
FIG. 4 is a left end elevation of the disconnect tool shown in FIG. 3.

FIG. 4 is a left end elevation of disconnect tool 15. As shown, disconnect tool 15 is split along a first radial cut 36 and a second radial cut 38 to form first member 16 and second member 18. First and second radial cuts 36, 38 are typically performed by an electro-discharge machining (EDM) operation. This machining operation removes a very small quantity of material. Accordingly, bore 31 has a substantially-cylindrical and continuous surface. This is important because, in use, bore 31 will engage a cylindrical fluid line. Other machining operations may be used to split the ring-like structure of disconnect tool 15, such as sawing. However, these methods are not the preferred method of manufacture.

Adverting now to FIG. 3, the expansion means 22 is generally defined by the left marginal portion of inner surface 30, annular verticle surface 32, and outer cylindrical surface 33. It is connected to engagement means 23 at annular verticle seam 37. In this fashion, expansion means 22 is essentially tube-like in geometry and has an inner diameter substantially the same as the inner diameter of engagement means 23. Expansion means 22 is generally composed of a plurality of fingers, severally indicated at 20. Fingers 20 are defined by a plurality of grooves, severally indicated at 21, which are positioned between fingers 20. The depth of grooves 21 generally do not exceed the length of surface 33. In this manner, expansion means 22 resembles a castellated tube.

Figure 5:
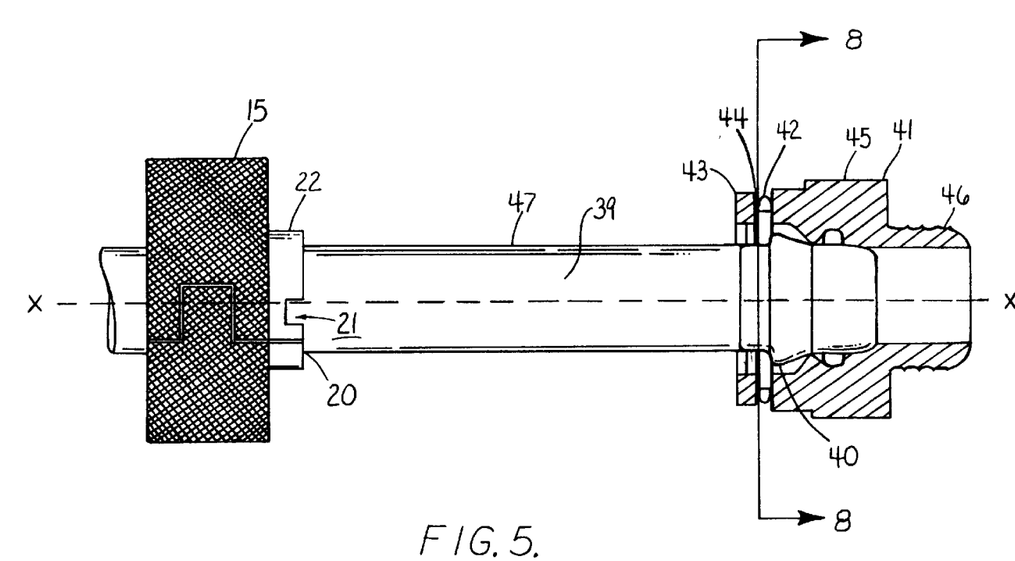
FIG. 5 is a fragmentary view, partly in longitudinal verticle section and partly in elevation, showing the disconnect tool engaging a fluid line, and showing the fluid line engaging a fluid coupling assembly, elongated along axis x—x.
Figure 6:
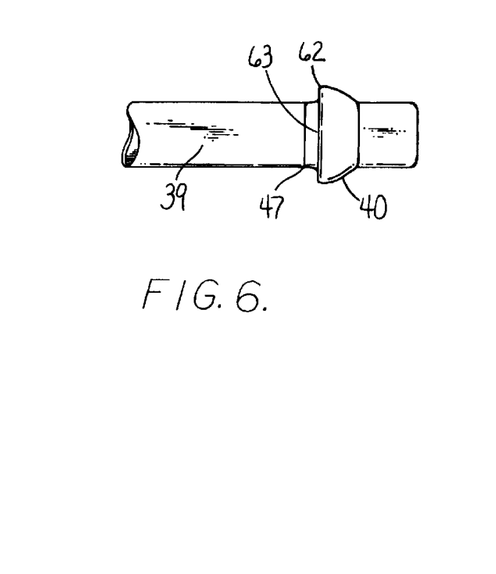
FIG. 6 is a fragmentary elevation showing the marginal end portion of the fluid line shown in FIG. 5.

FIG. 5 shows disconnect tool 15 installed on an intermediate end portion of fluid line 39. The right marginal end portion of fluid line 39 engages fluid coupling assembly 41. As shown in FIG. 6, fluid line 39 is a tubular element meant to communicate oil, air, or any other fluid (liquid or gas). Fluid line 39 has a cylindrical outer surface 47. Fluid line 39 is provided with a shoulder portion 40 having an outer cylindrical shoulder edge 62 and a leftwardly-facing annular verticle surface 63, such that outer edge 62 has a greater diameter than outer surface 47 of fluid line 39. Such geometries are well known in the fluid-sealing art.

As shown in FIG. 5, fluid coupling assembly 41 engages fluid line 39. Fluid coupling assembly 41 is provided with a standard seal to prevent fluid leakage. Fluid coupling assembly 41 is elongated along axis x—x, has a flange portion 43, a clip-receiving groove 44, a hexagonal outer surface 45, and a threaded portion 46. Fluid coupling assembly 41 is provided with an axial through-bore to receive fluid line 39. Retaining clip 42 fits within clip-receiving groove 44.

Figure 7:
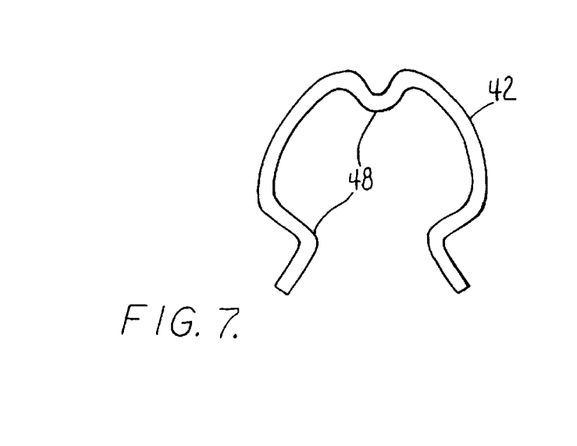
FIG. 7 is a left end elevation of the retaining clip shown in FIG. 5.

Referring now to FIG. 7, retaining clip 42 is shown as having a plurality of U-shaped protrusions 48 which extend radially inwardly, and are intended to abut surface 63 of shoulder portion 40 so as to lock fluid line 39 to fluid coupling assembly 41. Retaining clip 42 is generally circular in nature and is formed from a continuous piece of spring wire. In this manner, retaining clip 42 possesses spring-like characteristics. Retaining clip 42 is capable of securing fluid line 39 within fluid coupling assembly 41 even when axial forces are either externally applied, or internally applied by the pressure of the fluid communicating through the fluid line.

Figure 8:
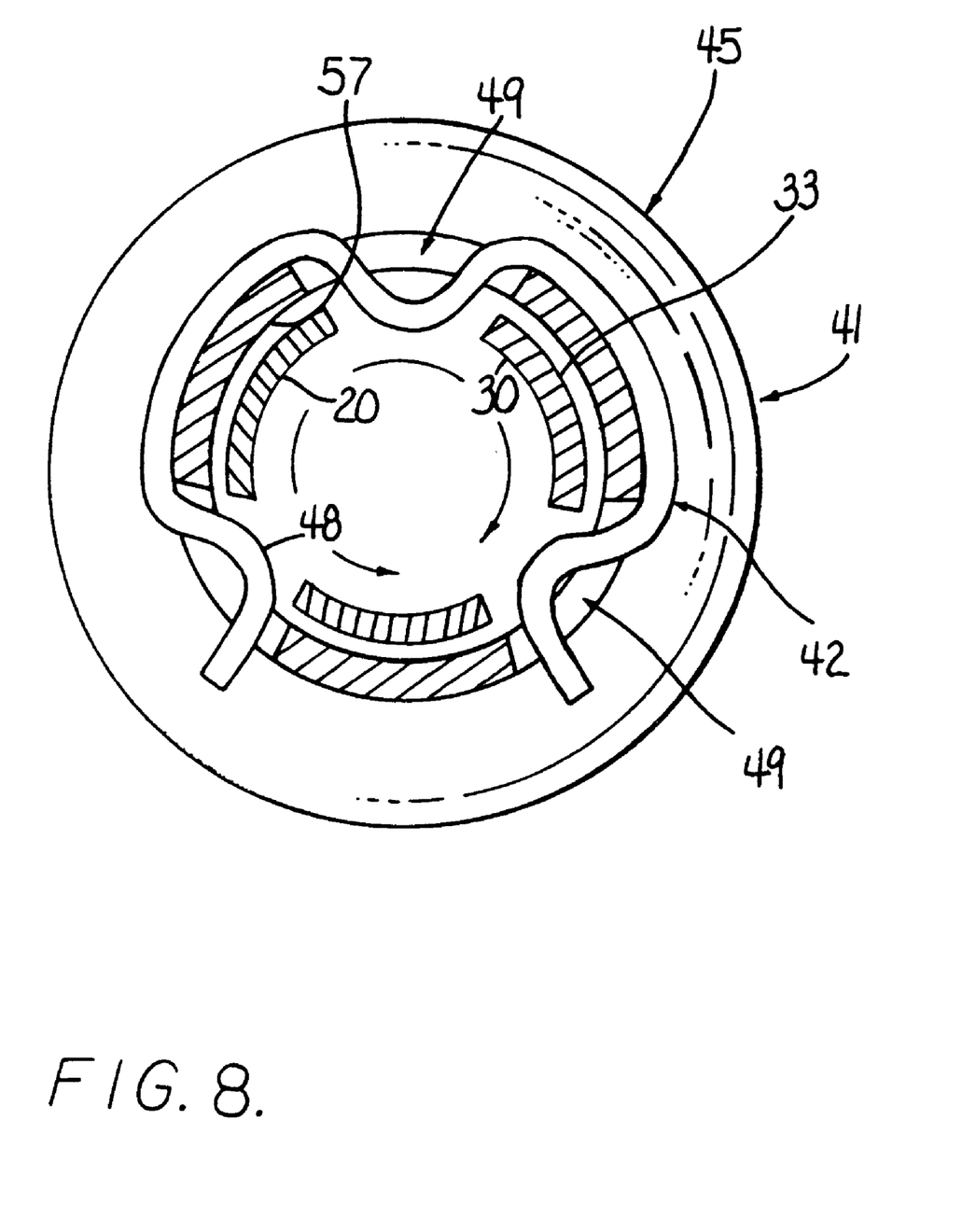
FIG. 8 is a fragmentary transverse vertical sectional view, taken generally on line 8—8 of FIG. 5, without the fluid line, but showing the fingers of the disconnect tool positioned to engage the protrusions of the retaining clip, and generally showing the directions of rotation necessary to expand the retaining clip outwardly.

Referring to FIG. 8, a plurality of slots, severally indicated at 49, communicate clip-receiving groove 44 with the axial through-bore of fluid coupling assembly 41. Slots 49 are generally configured and arranged to permit protrusions 48 to extend therethrough. Referring now to FIG. 5, it is seen that in this fashion, protrusions 48 abut leftwardly facing surface 63 of shoulder portion 40 of fluid line 47. This prevents fluid line 39 from being removed from fluid coupling assembly 41. In order to remove fluid line 39 from fluid coupling assembly 41, protrusions 48 must be expanded radially and outwardly beyond outer edge 62 of shoulder portion 40. This expansion permits fluid line 39 to be pulled leftwardly from fluid coupling assembly 41.

Normally, this disassembly process is a difficult and time-consuming task. In the past, methods to remove fluid line 39 from fluid coupling assembly 41 have included complete removal of retaining clip 42, through the use of flat-bladed screwdrivers or similar tools. This may result in the plastic deformation of retaining clip 42, which is undesirable.

Disconnect tool 15 facilitates the removal of fluid line 39 from fluid coupling assembly 41. Specifically, disconnect tool 15 is designed to cause the expansion of retaining clip 42 so as to permit fluid line 39 to be removed from fluid coupling assembly 41. The invention operates as follows. Disconnect tool 15 is opened about pivot pin 19 and then closed about fluid line 39, thus engaging fluid line 39. The diameter of surface 30 of disconnect tool 15 is slightly greater than the diameter of outer surface 47 of fluid line 39. Hence, disconnect tool 15 is concentrically positioned about fluid line 39.

Referring to FIGS. 5 and 8, disconnect tool 15 is translated axially along axis x—x in a rightwardly direction until fingers 20 abut protrusions 48 of retaining clip 42. Disconnect tool 15 is then rotated about axis x—x until protrusions 48 are aligned with grooves 21. Disconnect tool 15 is then moved axially in a rightward direction such that protrusions 48 slide within grooves 21 as shown in FIG. 8. As best shown in FIG. 8, the diameter of cylindrical surface 33 is slightly less than the diameter of the left marginal portion of the fluid coupling assembly through-bore, indicated at 57. The diameter of outer edge 62 of shoulder portion 40 is also slightly less than the diameter of through-bore 57. The diameter of outer cylindrical surface 33 of disconnect tool 15 must be equal to or greater than the diameter of outer edge 62 of shoulder portion 40 of fluid line 39. Disconnect tool 15 is then rotated about axis x—x until fingers 20 each engage protrusions 48. Protrusions 48 have an inclined U-shaped geometry such that protrusions 48 ride up onto outer surface 33 of fingers 20 when disconnect tool 15 is rotated with respect to fluid coupling assembly 41. This causes retaining clip 42 to be expanded radially and outwardly. Because the diameter of outer surface 33 of fingers 20 is equal to or greater than the diameter of outer edge 62 of shoulder portion 40, fluid line 39 may then be removed from fluid coupling assembly 41 without interference from protrusions 48 of retaining clip 42.

When protrusions 48 are resting on top of cylindrical surface 33, both fluid line 39 and disconnect tool 15 are moved in a leftward direction with respect to fluid coupling assembly 41 such that fluid line 39 is disconnected from fluid coupling assembly 41. Once shoulder portion 40 of fluid line 39 is moved beyond retaining clip 42, retaining clip 42 is then able to close radially and inwardly to its original geometry. Because the diameter of cylindrical surface 33 is only equal to or slightly greater than the diameter of outer edge 62 of shoulder portion 40, retaining clip 42 may be expanded radially and outwardly without placing undue stress or plastic deformation on retaining clip 42. This results in a process which does not damage retaining clip 42. Hence, retaining clip 42 may be used in numerous disconnect and reassembly procedures.

Figure 9:
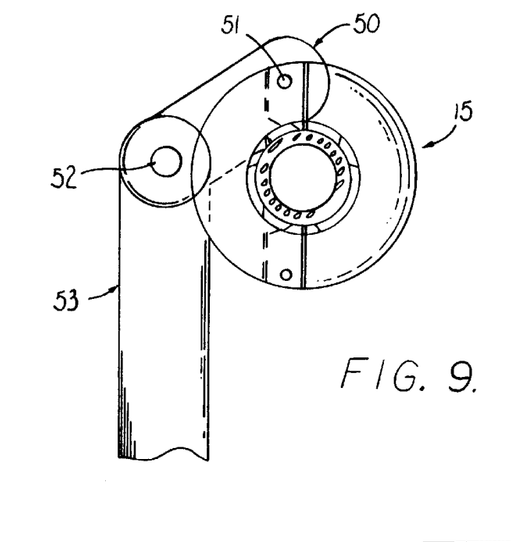
FIG. 9 is a left end elevation of an alternate embodiment of the disconnect tool, showing the addition of a handle to facilitate rotation of the disconnect tool.

Referring now to FIG. 9, an alternate embodiment of disconnect tool 15 is shown. In this embodiment, disconnect tool 15 is provided with a handle 50 connected to first and second members 16, 18 by handle pin 51. Handle pin 51 serves to lock first and second members 16, 18 to each other during the rotation process. Handle pin 51 extends through slot 24 and tongue 25 to accomplish this locking feature. Locking pin 51 then attaches to handle 50. Handle 50 is a flat planar member. Handle 50 is joined at its opposite end to lever 53 by lever pin 52. Lever 53 is allowed to rotate with respect to handle 50 by means of lever pin 52. In this fashion, a resultant lever arm is generated which permits additional torque to be applied about axis x—x to facilitate the expansion of protrusions 48 by fingers 20 during the rotation of fingers 20 with respect to protrusions 48. In addition, in this embodiment, disconnect tool 15 may be positioned over fluid line 39 at a convenient and accessible point along fluid line 39, locked in place with pin 51, and then moved along fluid line 39 by handle 50 to coupling assembly 41, which may be unaccessible by hand.

Figure 10:
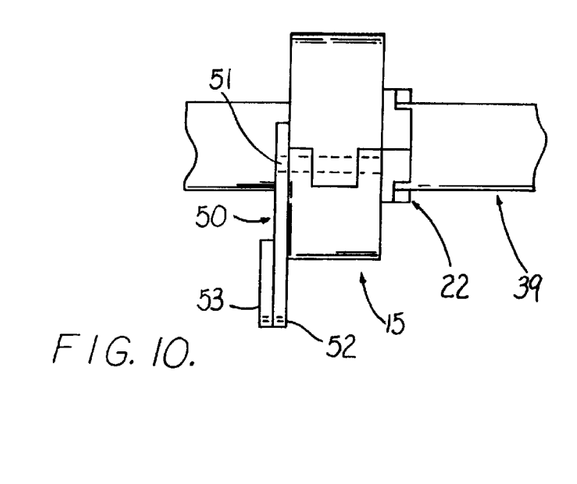
FIG. 10 is an elevation of the disconnect tool of FIG. 9 engaging the fluid line, elongated along axis x—x.

FIG. 10 is a side elevation of the handle shown in FIG. 9. As seen in this figure, handle 51 is connected to disconnect tool 15 opposite castellated tube portion 22.

Figure 11:
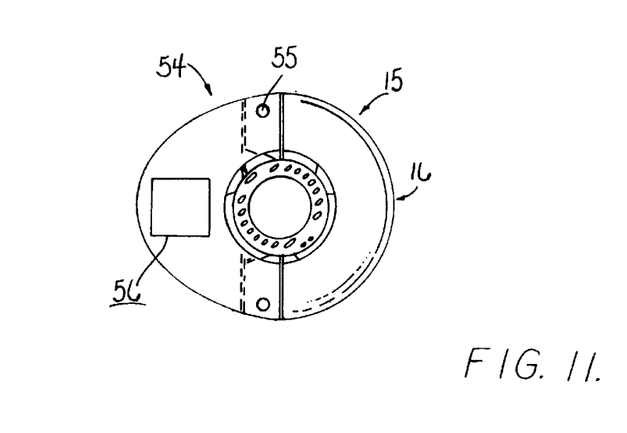
FIG. 11 is a left end elevation of an alternate embodiment of the disconnect tool showing the addition of a square recess.

FIG. 11 depicts an alternate embodiment of disconnect tool 15. As shown in this figure, first member 16 is of substantially similar construction as in the previous embodiments. However, in this embodiment disconnect tool 15 is provided with a specially-configured elliptical second member 54. Second member 54 is configured and arranged to provide sufficient materials for a square recess 56. Square recess 56 is configured and arranged to accept the square drive of a socket wrench or a similarly figured torque-producing tool. Thus, the square stud portion of a socket wrench may be inserted into recess 56 to assist in rotation of disconnect tool 15. A lock pin 55 is provided to lock tongue 25 and slot 24 together. This prevents inadvertent opening of disconnect tool 15 during the disconnect process.

Figure 12:
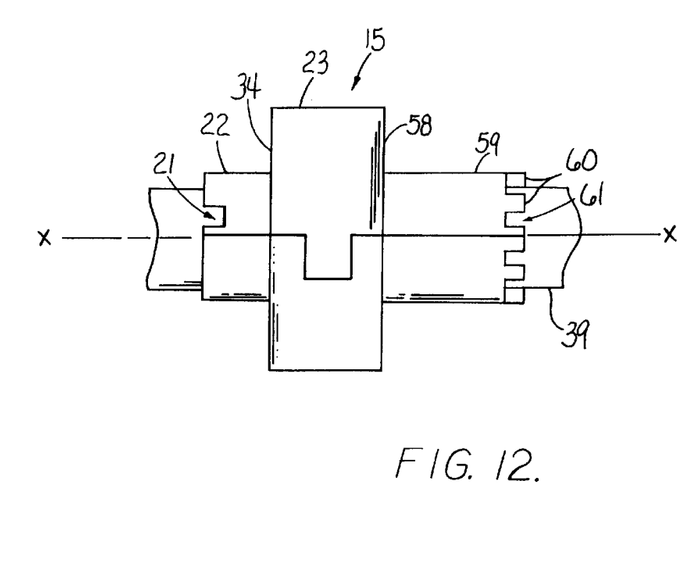
FIG. 12 is a front elevation of yet another alternate embodiment of the disconnect tool showing a pair of alternate expansion means, elongated along axis x—x.

FIG. 12 depicts another embodiment of the present invention. As shown in this figure, disconnect tool 15 is provided with a left hand portion which includes a castellated tube portion 22 identical to the geometry described in the earlier embodiments of this invention. However, the second side 58 of disconnect tool 15 is provided with a second expansion means 59. This expansion means is also configured as a castellated tube. However, second expansion means 59 contains a plurality of fingers, severally indicated at 60, which define a plurality of grooves, severally indicated at 61, of a different geometry than expansion means 22. Second expansion means 59 may be used to disconnect fluid coupling assemblies having a geometry different from the geometry of fluid coupling assembly 41. For example, the retaining clips described thus far have been shown with three protrusions. One may envision retaining clips having more than three protrusions. Similarly, one might envision a retaining clip with less than three protrusions. Accordingly, expansion means 59 may be provided with more or less fingers 60 to accommodate these varying retaining clip configurations. Also, the outer diameter of castellated tube portion 59 may be greater or less than the outer diameter of castellated tube portion 22 to facilitate engagement with varying fluid coupling assembly geometries. Similarly, the length of second castellated tube portion 59 may be greater or less than the length of castellated tube portion 22 to similarly accommodate varying fluid coupling geometries.

Disconnect tool 15 is typically constructed of high strength tool steel material. However, in alternate embodiments, it is envisioned that disconnect tool 15 could be made of a high strength abrasion-resistant thermoplastic or thermosetting material.

Modifications

The present invention contemplates that many changes and modifications may be made. The particular materials of which the various body parts and components parts are formed are not deemed critical and may be readily varied. Although tool steel has been cited as the preferred material of construction for the disconnect tool, other steel alloys or other metals or plastics may be substituted therefore. Similarly, the particular shape of the individual component body parts may be altered, modified or varied by a skilled designer. The various component parts may be contiguous or independent, as desired. While a clamshell configuration of the disconnect tool is the preferred embodiment, one may envision a number of embodiments performing substantially the same function in a slightly different configuration.

While the expansion means has been shown connected with the engagement means, one might envision an assembly where variously-configured expansion means may be bolted or otherwise connected to the engagement means. For example, the expansion means could be threaded into the engagement means. By threading the castellated tube portion into or out of the engagement means, the disconnect tool could be used with a variety of castellated tube portions compatible with fluid coupling assemblies having a number of different configurations.

The geometry of the fingers and grooves may be adapted readily to accommodate a variety of different retainer clip geometries. The length of the castellated tube portion may be similarly altered to provide a universal length, or a length which accommodates various fluid coupling assemblies. These geometries and lengths may be readily varied by a skilled designer.

Similarly, the geometry of the expansion means is shown as first and second members configured in a ring-like structure. This geometry could easily be varied. For example, it could be octagonal to facilitate use with an open-ended wrench to facilitate rotation of the disconnect tool with respect to the fluid coupling assembly.

While a manual version of the present disconnect tool has been described herein, one may easily envision an automated tool which is actuated by pneumatics, hydraulics or electrical motors. This would be useful in mass production. Thus, the present invention should not be construed as being limited to manual actuation.

While several handle configurations have been shown and described, one may envision a number of different handle geometries which serve the same function. For example, a rod may be used rather than the handle and the handle pin shown in FIGS. 9 and 10. The rod could have a diameter equivalent to the handle pin such that the rod could be one continuous component and could function as both handle and handle pin.

While the first and second members of the expansion means may be locked in a ring-like geometry by a locking pin, one may envision a spring being incorporated into the tool which would exert a force on the members. This force could be such that the members would be locked in the ring-like geometry unless manually opened.

Similarly, to facilitate rotation, the geometry of the fingers could be modified to assist in ramping the protrusions up and onto the fingers' outer surface. In this situation, the fingers could be provided with ramped or inclined surfaces to reduce the torque necessary for rotation.

Therefore, while the presently-preferred form of the disconnect tool has been shown and described, and several modifications discussed, persons skilled in this art will readily appreciate that various additional changes and modifications may be made without departing from the spirit of the invention, as defined and differentiated by the following claims.

What is claimed is:

1. A disconnect tool for disengaging a fluid line from a fluid coupling assembly, said fluid line having a shoulder portion and said coupling assembly having a retaining clip and a clip-receiving groove, said retaining clip having a plurality of protrusions, said groove having a plurality of slots for receiving said protrusions, such that said protrusions extend through said slots to engage said shoulder portion thus locking said fluid line to said coupling assembly, the improvement comprising:

engagement means for engaging said fluid line; and expansion means for expanding said retaining clip such that each of said protrusions are disposed radially outwardly through each of said slots;

whereby said fluid line may be selectively removed from said coupling assembly.

2. The disconnect tool as set forth in claim 1, wherein said engagement means comprises:

a first member pivotally connected to a second member;

and wherein said first and second members form a ring-shaped structure having a bore to accommodate said fluid line.

3. The disconnect tool as set forth in claim 2, and further comprising a locking pin.

4. The disconnect tool as set forth in claim 1, wherein said first and second members include:

a cylindrical outer surface;

and wherein said surface is provided with a knurled texture to facilitate rotation of said disconnect tool.

5. The disconnect tool as set forth in claim 1, wherein said expansion means comprises:

a castellated tube portion having a plurality of fingers;

said fingers defining a plurality of grooves therebetween;

and wherein said fingers and grooves are so configured and arranged as to allow positioning of said fingers to engage said protrusions;

whereby said castellated tube portion can be selectively rotated such that said protrusions are displaced radially outwardly by said fingers so as to allow said fluid line to be selectively disengaged from said coupling assembly.

6. The disconnect tool as set forth in claim 5 wherein said fingers are variable in width and depth.

7. The disconnect tool as set forth in claim 1, and further comprising a handle.

8. The disconnect tool as set forth in claim 1, wherein said engagement means includes a recess which accommodates a square drive wrench.

9. The disconnect tool as set forth in claim 1, wherein said engagement means comprises:

a ring-shaped structure having a first side and a second side;

said expansion means fixedly connected to said first side; and further including a second expansion means fixedly connected to said second side.

10. The disconnect tool as set forth in claim 9 wherein said second expansion means comprises a different configuration of fingers and grooves than said expansion means.

11. A method for disconnecting a fluid line from a fluid coupling assembly, said fluid line having a shoulder portion and said coupling assembly having a retaining clip and a clip-receiving groove, said retaining clip having a plurality of protrusions, said groove having a plurality of slots for receiving said protrusions, such that said protrusions extend through said slots to engage said shoulder portion, thus locking said fluid line to said coupling assembly, comprising the steps of:

providing a disconnect tool having an expansion means;

positioning said expansion means to engage said protrusions;

rotating said tool with respect to said retaining clip, such that said protrusions are displaced radially outwardly by said expansion means; and removing said fluid line from said coupling assembly.

12. The method as set forth in claim 11, comprising the further steps of:

providing a disconnect tool having a handle;

locking said disconnect tool around said fluid line;

moving said disconnect tool along said fluid line with said handle; and rotating said tool with said handle.

* * * * *